(12) United States Patent
Russell

(10) Patent No.: US 7,273,021 B1
(45) Date of Patent: Sep. 25, 2007

(54) WILD BIRD GAME FEEDER

(76) Inventor: Ralph Edward Russell, HC 71 Box 166, Ellamore, WV (US) 26267

( * ) Notice: Subject to any disclaimer, the term of this patent is extended or adjusted under 35 U.S.C. 154(b) by 0 days.

(21) Appl. No.: 11/231,089

(22) Filed: Sep. 20, 2005

(51) Int. Cl.
*A01K 39/01* (2006.01)
(52) U.S. Cl. .................................... 119/57.8; 119/52.2
(58) Field of Classification Search ............... 119/52.2, 119/52.3, 57.8, 57.9, 52.1
See application file for complete search history.

(56) References Cited

U.S. PATENT DOCUMENTS

| | | | | |
|---|---|---|---|---|
| 2,786,446 A | * | 3/1957 | Newman ................... | 119/52.2 |
| 3,157,159 A | * | 11/1964 | Koistinen et al. .......... | 119/52.2 |
| 3,372,676 A | * | 3/1968 | Williams ................... | 119/52.3 |
| 3,441,002 A | * | 4/1969 | Skirvin et al. ............. | 119/52.2 |
| 3,866,576 A | | 2/1975 | Downing | |
| 4,144,842 A | * | 3/1979 | Schlising ................... | 119/52.3 |
| 4,242,984 A | * | 1/1981 | Smith ........................ | 119/52.2 |
| 4,712,512 A | * | 12/1987 | Schreib et al. ............. | 119/52.2 |
| 4,732,112 A | * | 3/1988 | Fenner et al. .............. | 119/52.2 |
| 4,896,628 A | * | 1/1990 | Kadunce ..................... | 119/52.2 |
| 4,974,547 A | * | 12/1990 | Graham ...................... | 119/52.2 |
| 5,289,796 A | * | 3/1994 | Armstrong .................. | 119/52.3 |
| 5,642,689 A | * | 7/1997 | Harvey ....................... | 119/57.8 |
| 5,829,383 A | * | 11/1998 | Blanding .................... | 119/52.3 |
| 5,829,384 A | * | 11/1998 | Landry ....................... | 119/52.3 |
| 6,863,024 B1 | | 3/2005 | Obenshain | |
| 6,895,894 B2 | | 5/2005 | Fort, II | |

* cited by examiner

*Primary Examiner*—David Parsley
(74) *Attorney, Agent, or Firm*—John J. Giblin, Jr.; Bowles Rice McDavid Graff & Love LLP

(57) ABSTRACT

A wild bird game feeder, having a cylindrical shell with a closed flat bottom and a lid which is removable or which has a bung, through which game bird feed may be introduced. Within the interior of the cylindrical shell is a partition and partition top which defines and encloses a smaller subspace within the interior space of the cylindrical shell. An opening in the partition allows feed to flow into the smaller space. An access opening is defined in the sidewall of the cylindrical shell, giving external access to the smaller space within the partition and partition top. A curvilinear hood is positioned medially above the access opening. A perch or ledge is provided along the bottom edge of the access opening for the benefit of smaller game birds.

12 Claims, 6 Drawing Sheets

US 7,273,021 B1

WILD BIRD GAME FEEDER

BACKGROUND OF THE INVENTION

1. Field of the Invention

The present invention relates to an apparatus for providing feed for wild game birds, such as pheasants, quail and the like.

2. Background of the Related Art

Hunting is a popular recreational pastime for many people of all ages. Many species of wild game are sought after by these hunters. One class of desired wild game includes wild birds, including pheasants.

A common challenge among all hunters is locating the intended prey. Hunters may walk many miles and many hours without spotting a single game animal. To reduce this unproductive time, hunters often provide some means of attracting wild game to a particular plot of land. These means include providing food which is desired by the particularly sought game species. However, if the feed is placed in the open and exposed to rain and other weather, the feed becomes saturated with water, physically deteriorates and can become infested with mold, thus becoming undesirable to game species. A means for protecting wild game feed from precipitation is desirable.

A number of devices are available to contain wild game feed and protect against weather, to varying extents. For example, Lillig, U.S. Pat. No. 6,481,374, teaches of a deer feeder having a vertical cylindrical reservoir and an oblique cylindrical feeding port, through which an animal must insert its snout to access the feed supply. However, it would not be suitable for game birds which are usually too timid to insert their heads into such a narrow and deep confined space.

Other feeders embody a design consisting of a trough into which seed is dispensed by gravity means. LaVanish, U.S. Pat. No. 6,581,540 is one example of such a design. However, an open trough design fails to consider the manner of feeding typically exhibited by birds. They often sweep feed side to side, clearing away hulls or undesired feed, searching for more desired feed underneath. An open trough does not contain the feed dislodged during this behavior, and often results in considerable amounts of feed or seed spilled onto the ground.

SUMMARY OF THE INVENTION

To overcome the limitations and disadvantages in the field of this invention, a wild game bird feeder is provided, comprising a container with a vertical cylindrical wall and a flat bottom. Within the interior space or volume of the container is a vertical semi-cylindrical partition which conjoins with the cylindrical wall at its two vertical side edges. The partition has a top that together defines and isolates a smaller subspace within the larger container space. Communication between the overall container volume and the subspace enclosed within the partition and top is by a single partition opening, comprising a rectilinear slot medially located at the bottom edge of the partition.

Access is provided into the partition subspace from the environment by an access opening in the cylindrical wall. The access opening is disposed medially between the intersections of the partition side edges and the cylindrical wall. An arcuate hood is further provided, disposed above the access opening.

The vertical partition with a slot at its bottom edge provides the advantage of reducing the volume of feed accessible to game birds, thereby reducing the amount of waste produced from the birds' feeding behavior. The accessible subspace where the feed is located, which is fully enclosed within the container, is protected from rain and other elements which could degrade the feed. Further protection is provided by the hood located over the access opening.

In one embodiment, a perch or ledge is provided at the bottom edge of the access opening, facilitating the use of the wild game bird feeder by smaller birds.

These and other advantages of the invention will become apparent from the description which follows. In the description, reference is made to the accompanying drawings, which from a part hereof, and in which is shown by way of illustration specific embodiments in which the invention may be protected. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

DETAILED DESCRIPTION OF THE PREFERRED EMBODIMENTS

Figure 1:
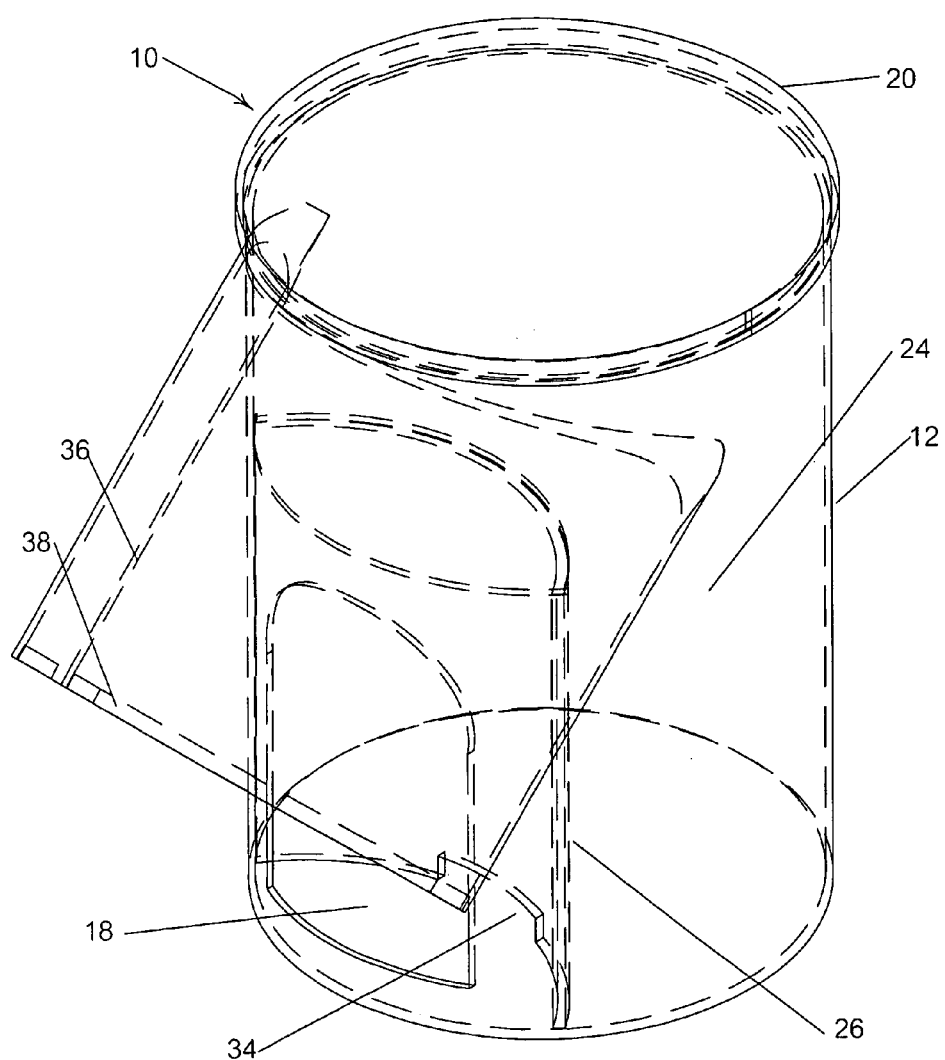
FIG. 1 is an isometric view of an embodiment of the invention.
Figure 2:
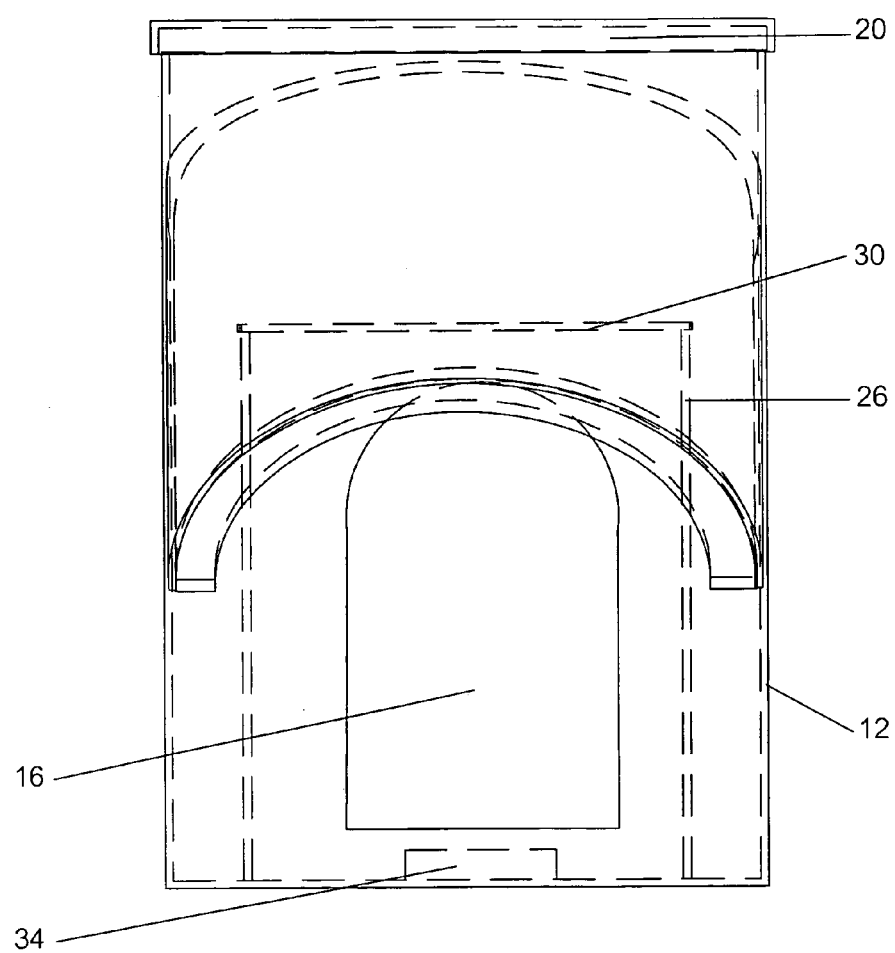
FIG. 2 is a front elevation view of an embodiment of the invention.
Figure 3:
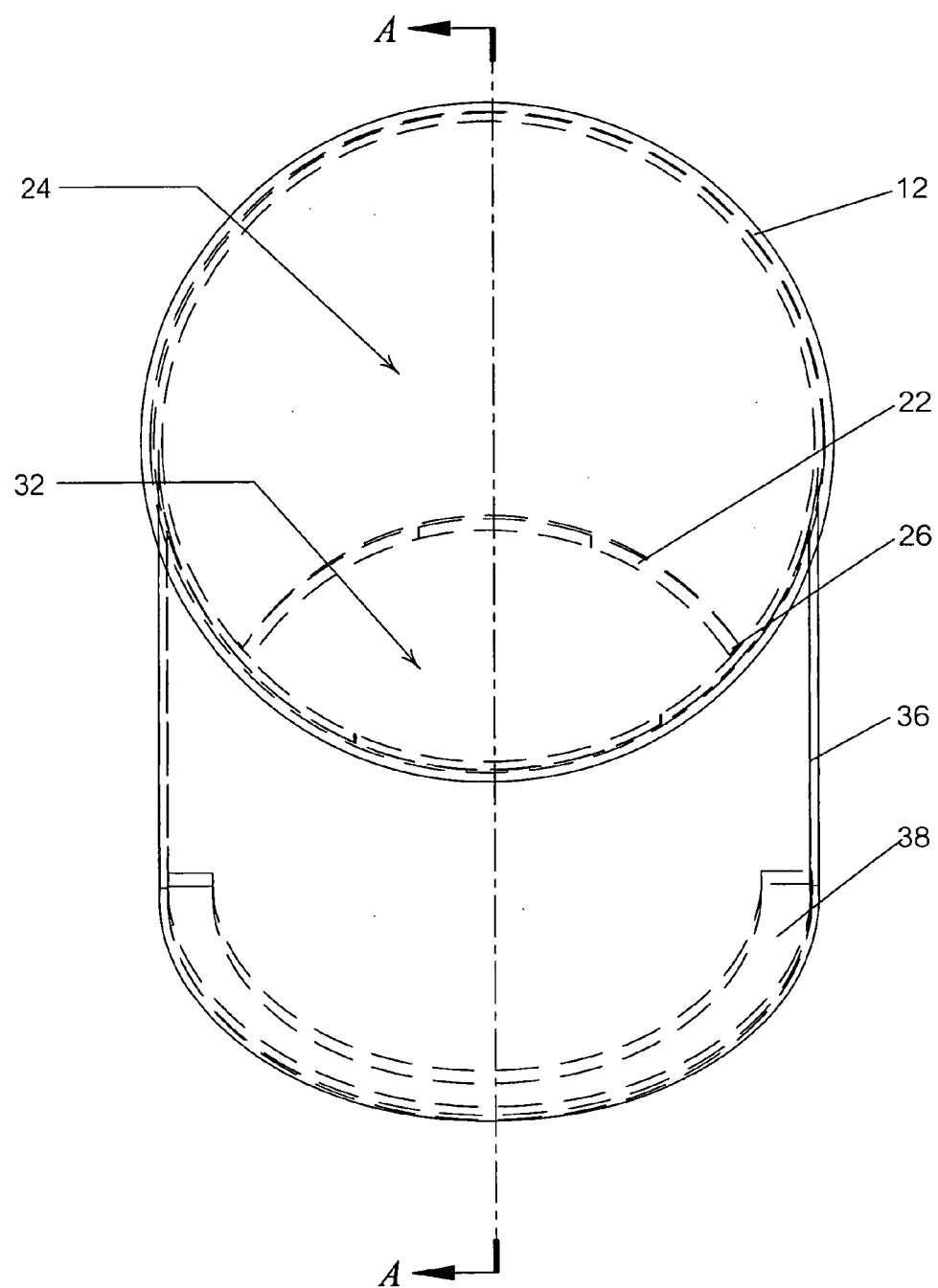
FIG. 3 is a top plan view of an embodiment of the invention with a sectional line.

The following discussion describes in detail one or more embodiments of the invention. The discussion should not be construed, however, as limiting the invention to those particular embodiments, and practitioners skilled in the art will recognize numerous other embodiments as well. The complete scope of the invention is defined in the claims appended hereto.

In the following description and in the drawings appended hereto, a wild bird game feeder is generally referenced as 10.

As shown in FIGS. 1, 2, 3 and 4, a wild bird game feeder is comprised of, in part a cylindrical wall 12 with a circular horizontal cross-section and a bottom 16, the perimeter of which is typically integral with the bottom edge of the cylindrical wall 12. The cylindrical wall 12 and bottom 16 are typically fabricated of a polymer resin, such as high density polyethylene or polypropylene, by molding processes well known in the relevant art.

An access opening 18 is defined within the cylindrical wall 12. The access opening 18 typically has a straight lower edge parallel to and elevated above the bottom 16, which permits a quantity of game bird feed to rest on the top surface of the bottom 16 without flowing out through the access opening 18. The height of the access opening 18 extends partially up the cylindrical wall 12, and preferably to the middle of the cylindrical wall 12. The sides and top of the access opening 18 may have a variety of shapes, as aesthetically desired.

A lid 20 is provided at the top edge of the cylindrical wall 12. The lid 20 encloses the interior space 24 defined by the cylindrical shell 12, but has means for accepting game bird feed into the interior space 24 of the wild bird game feeder 10. This may be facilitated as a removable lid 20 or an integral lid 20 having a bung 54 through which feed may be introduced.

Figure 4:
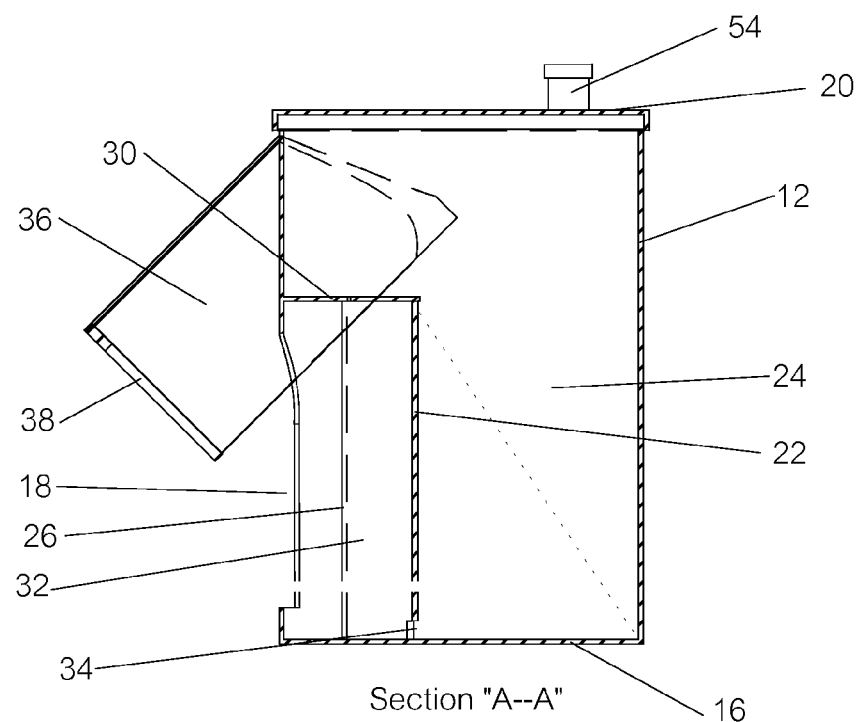
FIG. 4 is a sectional side elevation view, illustrating the partition of the invention.

As best shown in FIG. 4, a partition 22 is provided within the interior space 24 of the wild bird game feeder 10. The partition 22 has an upright, curvilinear wall with a concave surface and with top and bottom edges and two straight side edges 26. The partition 22 is installed within the interior space 24 such that the concave surface of the partition sidewall is directed toward the access opening and the partition side edges 26 conjoin with the interior surface of the cylindrical wall 12, preferably at equal distances from the vertical centerline of the access opening 18. The bottom edge of the partition 22 conjoins with the interior surface of the flat bottom 16 cylindrical wall 12.

The partition further has a top 30 which conjoins with the partition 22 top edge and the interior surface of the cylindrical wall 12, thereby defining a smaller interior subspace 32 within and isolated from the remainder of the interior space 24. The access opening 18 in the cylindrical wall 12 is entirely contained within this smaller interior subspace 32 enclosed by the partition 22 and partition top 30.

Figure 4A:
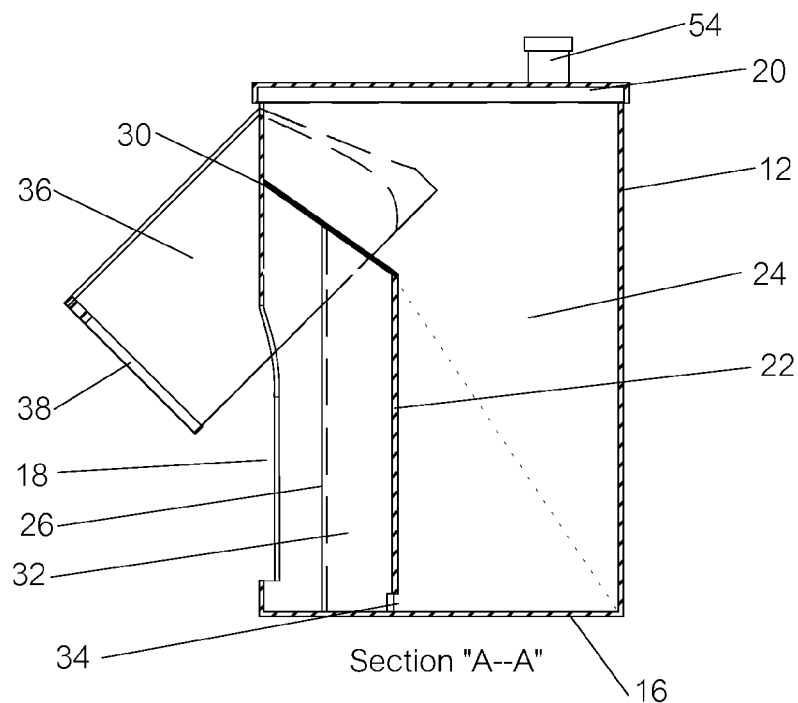
FIG. 4A is a sectional side elevational view, illustrating another embodiment of the partition top.

The partition top 30 is preferably flat and orthogonal to the cylindrical wall 12, as shown in FIG. 4, but may be inclined or sloped downward from the cylindrical wall 12 to the vertical centerline of the cylindrical wall 12, as shown in FIG. 4A. This slope prevents wild game bird feed that is less flowable from accumulating on the top of partition top 30. The partition top 30 may also be convex, accomplishing the same function of precluding an accumulation of wild bird game feed on the partition top 30.

A partition opening 34 is defined by the partition 22 to allow wild bird game feed stored in the interior space 24 to communicate and flow into the smaller interior subspace 32 defined by the partition 22 and top 30. This partition opening 34 is preferably a horizontal rectangular slot defined along the bottom edge of the partition 22. In any embodiment, the size of the partition opening 34 is adapted to permit the flow of game bird feed, which is usually in the form of pellets, into the interior subspace 32.

The wild game bird feeder 10 further comprises a hood 36 coupled to the exterior surface of the cylindrical wall 12. The hood 36 protects against rain and other debris from entering and contaminating the feed in the interior subspace 32. The hood 36 is preferably a curved sheet or section of a cylinder and is positioned medially above the access opening 18. The longitudinal axis of the hood 36 (i.e., the axis about which the cylindrical hood surface revolves) is in a radial plane extending from the longitudinal axis of the cylindrical wall 12 through the center of the access opening 18. The longitudinal axis of the hood 36 is at an angle below horizontal, preferably between 30 and 60 degrees below horizontal.

The outer edge section of the hood 36, i.e., that edge furthest radially from the cylindrical shell 12, may be structurally stiffened with an arcuate flange 38 coupled to the concave side of the hood 36. This flange 38, by extending further downward in front of the access opening 18, provides additional protection against rain and snow in the interior subspace 32.

Figure 5:
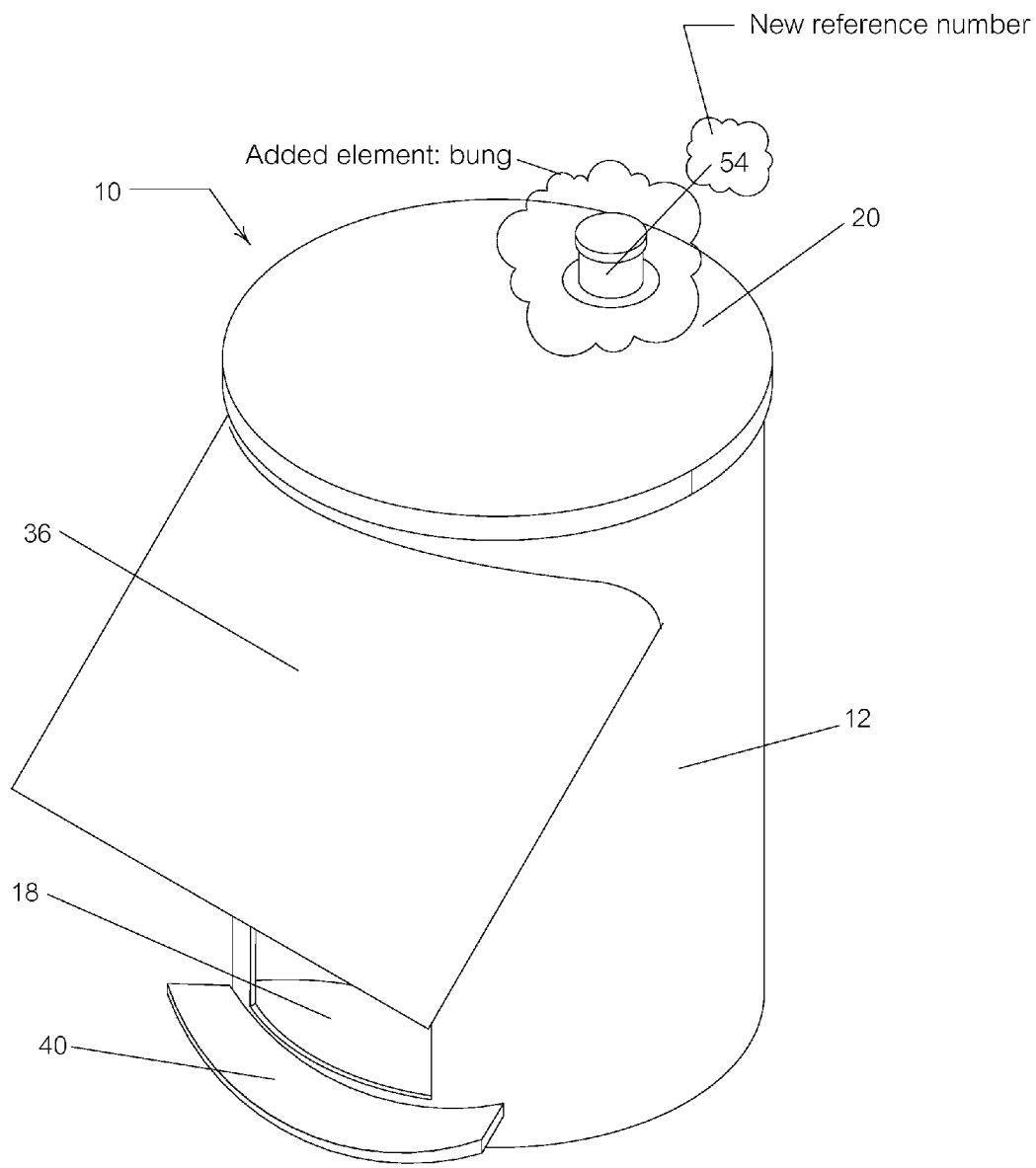
FIG. 5 is an isometric view, illustrating the ledge.

As shown in FIG. 5, the wild game bird feeder 10 may also have a horizontal ledge 40 located adjacent to the lower edge of the access opening 18. The ledge 40 provides means for smaller game birds to access the feed within the wild game bird feeder 10.

In use, the wild game bird feeder 10 may be set out for attracting game birds in a wilderness area by setting it on a stand or by attaching it to a vertical means of support, such as the trunk of a tree. Wild game bird feed is introduced into the interior space 24 of the cylindrical shell 12 by removing the lid 20, or the bung 54 in the lid 20, and pouring the feed therein. The weight of feed above it forces feed pellets through the partition opening 34 into the interior subspace 32, where it is available for consumption by game birds by inserting their heads through the access opening 18. As the feed in the interior subspace 32 is consumed, additional feed is forced by gravity through the partition opening 34, thereby continually replenishing the available feed within the smaller interior subspace 32 until all feed is consumed or the feed supply is replenished.

Figure 6:
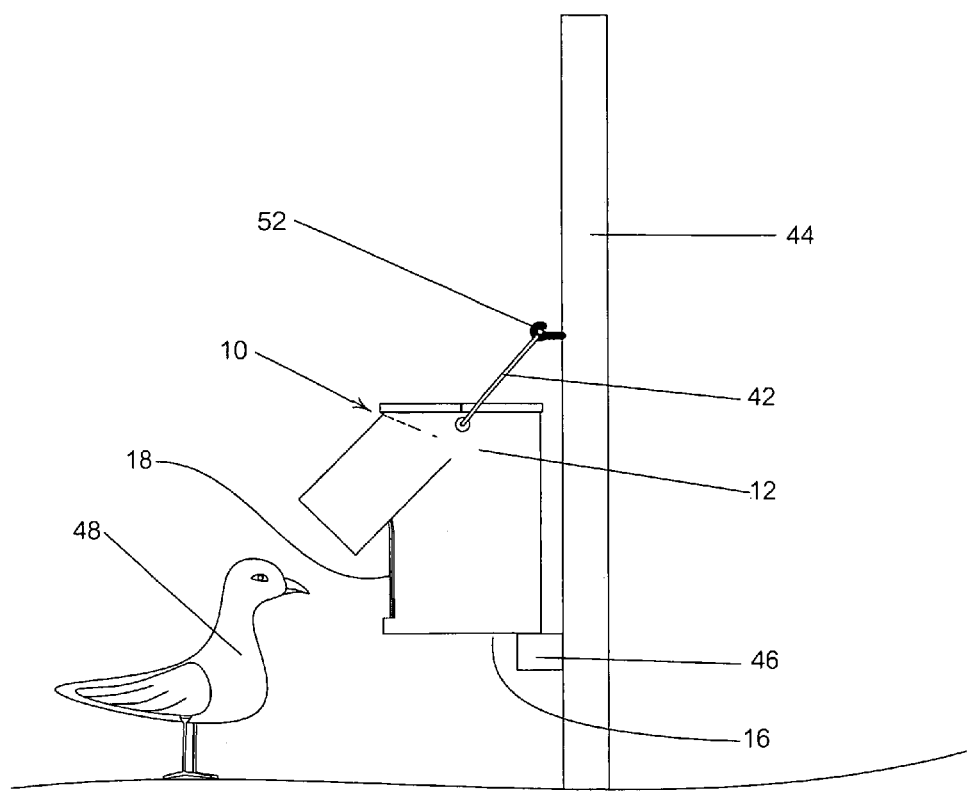
FIG. 6 is a side elevation view, illustrating the invention mounted for use.

A preferred method for placing the wild game bird feeder 10 into use is illustrated in FIG. 6. The wild game bird feeder 10 is mounted on a tree or post 44, which is disposed vertically in the ground 50, by means of a semicircular handle 42, the ends of which attach on either side of the cylindrical wall 12 equidistant from the access opening 18. A support block 46, such as a short length of dimensional lumber, and a screw hook 52 are attached to the post 44. The wild game bird feeder is then mounted on the post 44 by setting the bottom 16 on the support block 46, and engaging the handle 42 with the bight of the screw hook 52. The support block 46 and screw hook 52 should be located to place the access opening 18 of the wild game bird feeder 10 at a convenient height above the ground 50 for a wild game bird 48.

While various embodiments of the invention have been described above, it should be understood that they have been presented by way of example, and not limitation. It will be apparent to persons skilled in the relevant art that various changes in form and detail may be made therein without departing from the spirit, and scope and application of the invention. This is especially true in light of technology and terms within the relevant art that may be later developed. Thus, the present invention should not be limited by any of the above-described exemplary embodiments, but should only be defined in accordance with the appended claims and their equivalents.

I claim:

1. A wild game bird feeder, comprising:
   a) a cylindrical wall with a lower edge;
   b) a flat, planar bottom disposed at the lower edge of the cylindrical wall, said bottom extending across the cross-sectional area within the plane of the cylindrical wall lower edge;
   c) an upright, semi-cylindrical partition disposed within the cylindrical wall, the partition having two straight side edges conjoining the cylindrical wall, an arcuate bottom edge conjoining with the bottom and a first top edge, and further comprising a partition opening defined within the partition, said partition opening disposed proximate to the bottom edge and medially between the two side edges;
   d) a partition first top disposed inside the cylindrical wall and engaging with the top edge section of the partition and with the cylindrical wall;
   e) an access opening defined within the cylindrical wall medially between the two partition side edges, said access opening having defined a lower edge disposed above the closed flat bottom of the cylindrical wall; and f) a curvilinear hood disposed on the exterior surface of the cylindrical wall centrally above the access opening, the curvilinear hood having a concave surface, a longitudinal axis about which the hood surface is curved and an end section disposed distally from the cylindrical wall.

2. The wild bird game feeder of claim 1, further comprising a horizontal, ledge disposed proximate to the lower edge of the access opening.

3. The wild bird game feeder of claim 1, wherein the longitudinal axis of the hood is within a radial plane extending from the longitudinal axis of the cylindrical wall medially through the access opening.

4. The wild bird game feeder of claim 3, wherein the longitudinal axis of the curvilinear hood is canted between 30 and 60 degrees below horizontal.

5. The wild bird feeder of claim 1, wherein the partition top lies within a plane normal to the cylindrical wall.

6. The wild bird game feeder of claim 1, wherein the partition top lies within a plane which is canted downward towards the central axis of the cylindrical wall.

7. The wild bird game feeder of claim 1, wherein the partition top is convex.

8. The wild bird game feeder of claim 1, wherein the hood further comprises an arcuate stiffening flange disposed on the concave side of the end section of the hood.

9. The wild bird game feeder of claim 1, wherein the partition opening is disposed along the bottom edge of the partition.

10. The wild bird game feeder of claim 1, further comprising a second top edge on the cylindrical wall and a lid disposed on the second top edge.

11. The wild bird game feeder of claim 10 wherein the lid is removable.

12. The wild bird game feeder of claim 10, wherein the lid further comprises a bung adapted to receive game bird feed.

* * * * *